United States Patent
Liu et al.

(10) Patent No.: US 12,481,473 B2
(45) Date of Patent: Nov. 25, 2025

(54) DISPLAY DEVICE AND ASSOCIATED CONTROL METHOD

(71) Applicant: Realtek Semiconductor Corp., HsinChu (TW)

(72) Inventors: Chen-Wei Liu, HsinChu (TW); Yun-Ting Tsai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/745,987

(22) Filed: Jun. 17, 2024

(65) Prior Publication Data

US 2025/0156137 A1    May 15, 2025

Related U.S. Application Data

(60) Provisional application No. 63/598,145, filed on Nov. 13, 2023.

(30) Foreign Application Priority Data

Feb. 29, 2024   (TW) ................................. 113107149

(51) Int. Cl.
    *G06F 3/147*    (2006.01)
(52) U.S. Cl.
    CPC .................................... *G06F 3/147* (2013.01)
(58) Field of Classification Search
    CPC ...................................................... G06F 3/147
    See application file for complete search history.

(56) References Cited

U.S. PATENT DOCUMENTS

| | | | |
|---|---|---|---|
| 2006/0168627 A1* | 7/2006 | Zeinstra | H04M 1/6091 725/62 |
| 2021/0235229 A1* | 7/2021 | Kusens | H04W 4/60 |
| 2024/0231743 A1* | 7/2024 | Sun | H04L 69/08 |

FOREIGN PATENT DOCUMENTS

CN         112631538         4/2021

OTHER PUBLICATIONS

Liu, the specification, including the claims, and drawings in the U.S. Appl. No. 18/243,089, filed Sep. 6, 2023.

* cited by examiner

*Primary Examiner* — Chun-Nan Lin
(74) *Attorney, Agent, or Firm* — Winston Hsu

(57) ABSTRACT

The present invention provides a control method of a display device, wherein the control method includes the steps of: connecting to a first electronic device by using a first communication module, and receiving first image data from the first electronic device to display on a display panel; determining a first agent transmission control signal mode from a connection setting table according to a first connection mode between the first communication module and the first electronic device; and receiving a first control signal from an input device through an input device communication module, generating a second control signal according to the first control signal, and transmitting the second control signal to the first electronic device according to the first agent transmission control signal mode, to control an operation of the first electronic device.

10 Claims, 4 Drawing Sheets

DISPLAY DEVICE AND ASSOCIATED CONTROL METHOD

CROSS REFERENCE TO RELATED APPLICATIONS

This application claims the benefit of U.S. Provisional Application No. 63/598,145, filed on Nov. 13, 2023. The content of the application is incorporated herein by reference.

BACKGROUND OF THE INVENTION

1. Field of the Invention

The present invention relates to a method for a display device agent to transmit control signals.

2. Description of the Prior Art

When a user uses an electronic device, such as a mobile phone, to transmit audio-video data to a display device for display, if the user wants to control the mobile phone through a keyboard or mouse connected to the display device, it needs to use a display device agent control mechanism, so that the control signals of the keyboard or mouse are transmitted to the mobile phone through the display device. However, since there are a variety of mechanisms for display devices to transmit control signals, it can be confusing for ordinary consumers to understand so many mechanisms. In addition, when the display device supports the simultaneous display of image data from multiple signal sources, and these signal sources come from different image transmission interfaces, the current mechanism for the display device agent to transmit control signals cannot smoothly control these signal sources.

SUMMARY OF THE INVENTION

It is therefore an objective of the present invention to provide a control method of a display device, to solve the problems described in the prior art.

According to one embodiment of the present invention, a control method of a display device includes the steps of: connecting to a first electronic device by using a first communication module, and receiving first image data from the first electronic device to display on a display panel; determining a first agent transmission control signal mode from a connection setting table according to a first connection mode between the first communication module and the first electronic device; and receiving a first control signal from an input device through an input device communication module, generating a second control signal according to the first control signal, and transmitting the second control signal to the first electronic device according to the first agent transmission control signal mode, to control an operation of the first electronic device.

According to one embodiment of the present invention, a display device comprising a first communication module, an input device communication module and a processing circuit is disclosed. The processing circuit is configured to perform the steps of: connecting to a first electronic device by using the first communication module, and receiving first image data from the first electronic device to display on a display panel; determining a first agent transmission control signal mode from a connection setting table according to a first connection mode between the first communication module and the first electronic device; and receiving a first control signal from an input device through the input device communication module, generating a second control signal according to the first control signal, and transmitting the second control signal to the first electronic device according to the first agent transmission control signal mode, to control an operation of the first electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
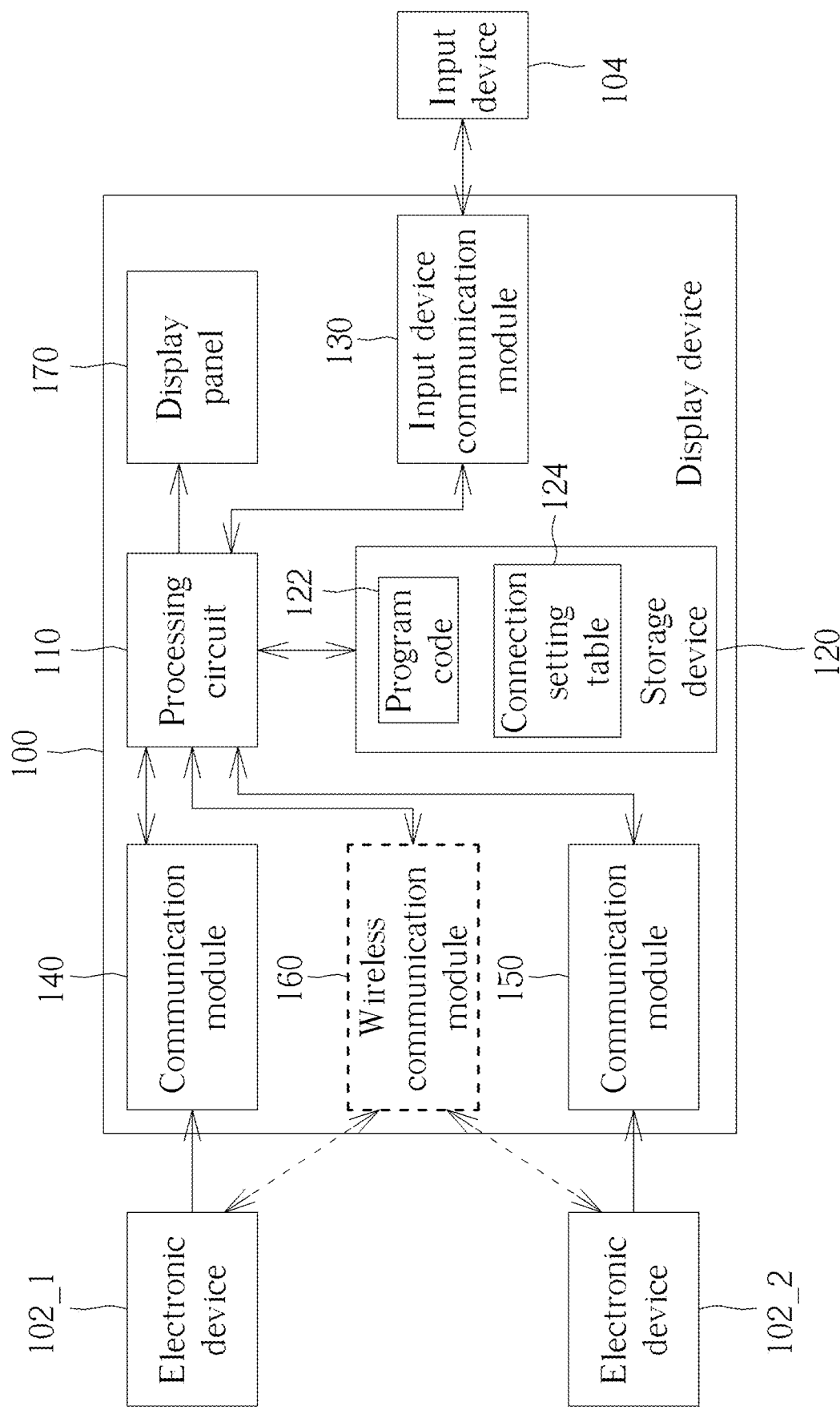
FIG. 1 is a diagram illustrating a display device according to one embodiment of the present invention.

FIG. 1 is a diagram illustrating a display device 100 according to one embodiment of the present invention. As shown in FIG. 1, the display device 100 includes a processing circuit 110, a storage device 120, an input device communication module 130, a communication module 140, a communication module 150, a wireless communication module 160 and a display panel 170, where the storage device 120 includes at least one program code 122 and a connection setting table 124. In this embodiment, the display device 100 can be any device that can display images, such as a television or a desktop monitor, and the display device 100 can receive audio and video/image data from one or more electronic devices such as 102_1 and 120_2, and simultaneously display the image data from the electronic devices 102_1 and 102_2 by using the display panel 170. In addition, the user can control the operation of the display device 100 and the electronic devices 102_1 and 102_2 through an input device 104 connected to the display device 100. In one embodiment, each of the electronic devices 102_1 and 102_2 can be a smart phone, a tablet computer, a notebook or any electronic device that can generate image data to the display device 100 for playback, and the input device 104 can be a wired/wireless mouse, a wired/wireless keyboard, or any other human interface device (HID) that can control the operation of the display device 100.

The input device communication module 130 can be any wireless communication module or wired communication module that can be connected to the external input device 104. For example, the input device communication module 130 may comprise a universal serial bus (USB) interface circuit, and communicate with the input device 104 through a USB transmission line. The input device communication module 130 may comprise a Bluetooth interface circuit or a Wi-Fi interface circuit, and communicate with the input device 104 through Bluetooth communication protocol or Wi-Fi communication protocol.

The communication module 140 can be any wireless communication module or wired communication module that can be connected to the external electronic device 102_1. For example, the communication module 140 may comprise a high-definition multimedia interface (HDMI) interface circuit, a displayport (DP) interface circuit or a USB type-C interface circuit, and the electronic device 102_1 can transmit image data to the communication module 140 through related protocols to playback. The communication module 140 may comprise a Wi-Fi interface circuit to communicate with the electronic device 102_1 through wireless display standards such as miracast or airplay.

The communication module 150 can be any wireless communication module or wired communication module that can be connected to the external electronic device 102_2. For example, the communication module 150 may comprise a HDMI interface circuit, a DP interface circuit or a USB type-C interface circuit, and the electronic device 102_2 can transmit image data to the communication module 150 through related protocols to playback. The communication module 150 may comprise a Wi-Fi interface circuit to communicate with the electronic device 102_2 through wireless display standards such as miracast or airplay.

The wireless communication module 160 may comprise a Wi-Fi interface circuit to communicate with the electronic devices 102_1 and 102_2 through a Wi-Fi direct mechanism. The wireless communication module 160 may comprise a Bluetooth interface circuit to communicate with the electronic devices 102_1 and 102_2 through the Bluetooth protocol.

The storage device 120 may include one or more storage elements of different types, such as a flash memory or a read-only memory (ROM) The program code 122 may comprise a driver and related parameters for controlling the display device 100, such as a Wi-Fi driver, a Bluetooth driver, etc. In addition, the processing circuit 110 can read the program code 122 from the storage device 120 to control the operations of the input device communication module 130 and the communication module 140, the communication module 150, the wireless communication module 160 and other components. In addition, the connection setting table 124 included in the storage device 120 includes a plurality of different connection modes, corresponding agent transmission control signal modes and corresponding setting parameters, the specific contents will be described in the following description.

In the embodiment shown in FIG. 1, the display device 100 can receive the control signal from the input device 104 and transmit the control signal to the electronic devices 102_1 and/or 102_2 as an agent, so that the user can control the operation of the electronic devices 102_1 and 102_2 through the input device 104. Specifically, firstly, the communication module 140 is connected to the electronic device 102_1, and the processing circuit 110 receives image data from the electronic device 102_1 through the communication module 140, and processes the image data and displays the processed image data on the display panel 170. In addition, in this embodiment, the electronic device 102_1 can display its entire screen content or a display content of an audio-video player on the display panel 170 through the projection mechanism. Similarly, the communication module 150 is connected to the electronic device 102_2, and the processing circuit 110 receives image data from the electronic device 102_2 through the communication module 150, and processes the image data and displays the processed image data on the display panel 170. In addition, in this embodiment, the electronic device 102_2 can display its entire screen content or a display content of an audio-video player on the display panel 170 through the projection mechanism.

In this embodiment, the display device 100 displays image data from the electronic devices 102_1 and 102_2 on the display panel 170 simultaneously. Taking FIG. 2 as an example, the screen on the display panel 170 can be divided into two display areas 210 and 220. The display area 210 is used to display the image data from the electronic device 102_1, and the display area 220 is used to display the image data from the electronic device 102_2. In addition, the user can operate the content on the screen through the input device 104, for example, using a mouse cursor 202 to click on the display area 210 or 220 to control the operation of the electronic device 102_1 or 102_2.

Figure 2:
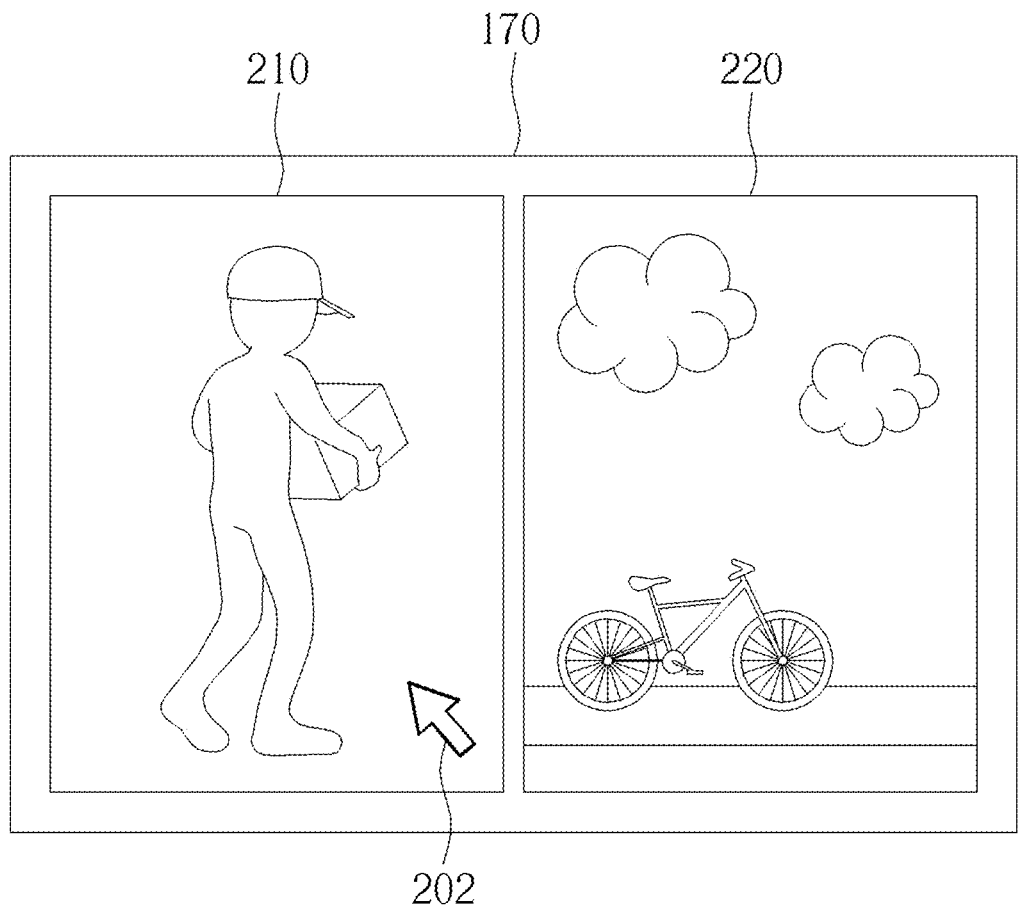
FIG. 2 is a diagram of a display panel displaying image data from two different electronic devices.
Figure 3:
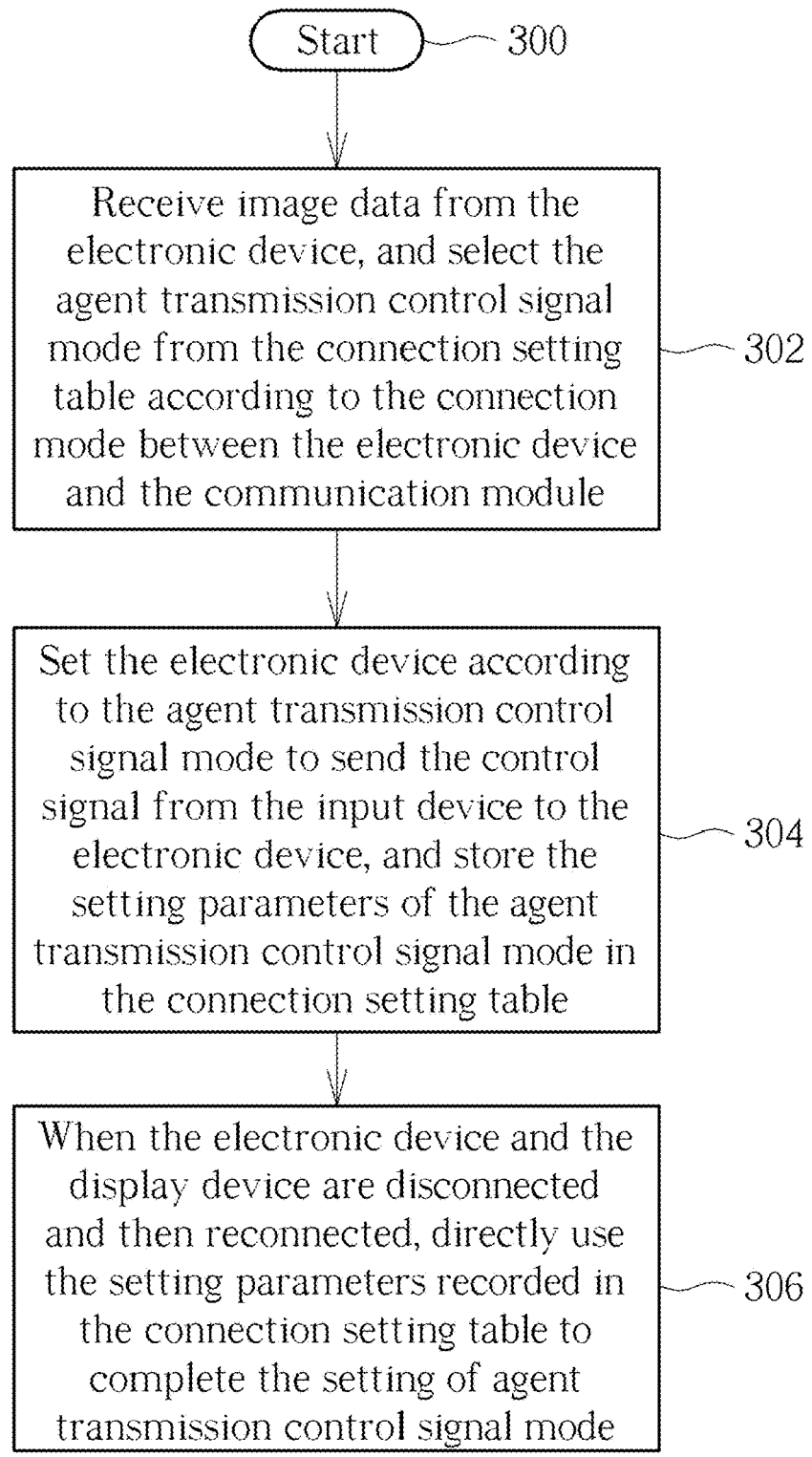
FIG. 3 is a flowchart of a control method of the display device according to one embodiment of the present invention.

FIG. 3 is a flowchart of a control method of the display device 100 according to one embodiment of the present invention. In Step 300, the flow starts, and the display device 100 is powered on and completes the initialization operation. In Step 302, the display device 100 connects with the electronic devices 102_1 and 102_2 through the communication modules 140 and 150, respectively, and receives image data from the electronic devices 102_1 and 102_2, and displays the received image data on the display panel 170 as shown in FIG. 2. In addition, the processing circuit 110 selects one or more agent transmission control signal modes from the connection setting table 124 according to the connection modes between the electronic devices 102_1, 102_2 and the communication modules 140, 150. Specifically, the connection setting table 124 may include multiple connection modes and corresponding agent transmission control signal modes. For example, when the connection mode between the communication module 140/150 and the electronic device 102_1/102_2 is miracast, the corresponding agent transmission control signal mode is also miracast (at this time, the wireless communication module 160 does not need to communicate with the electronic device 102_1/102_2). When the connection mode between the communication module 140/150 and the electronic device 102_1/102_2 is USB type-C, the corresponding agent transmission control signal mode is also USB type-C (at this time, the wireless communication module 160 does not need to communicate with the electronic device 102_1/102_2). When the connection mode between the communication module 140/150 and the electronic device 102_1/102_2 is HDMI or DP, the corresponding agent transmission control signal mode is Wi-Fi mode or Bluetooth mode.

In this embodiment, the processing circuit 110 can directly select one or more agent transmission control signal modes from the connection setting table 124 according to the connection modes between the electronic devices 102_1, 102_2 and the communication modules 140, 150. In another embodiment, the processing circuit 110 can display the contents of the connection setting table 124 on the display panel 170, or display all agent transmission control signal modes on the display panel 170, so that the user can select the desired mode.

In Step 304, the processing circuit 110 performs settings with the electronic devices 102_1 and 102_2 according to the selected one or more agent transmission control signal modes to send the control signal(s) from the input device 104 to the electronic device 102_1 or 102_2. In addition, after the processing circuit 110 uses one or more agent transmission control signal modes to set the electronic devices 102_1 and 102_2, the processing circuit 110 will store these setting parameters in the connection setting table 124 for subsequent use when reconnecting.

For example, assuming that the communication modules 140 and 150 include HDMI or DP interface circuits, and the electronic devices 102_1 and 102_2 transmit image data to the display device 100 through the HDMI or DP interface circuit, and the image data is displayed on the display panel 170 as shown in FIG. 2, the processing circuit 110 can choose to transmit the control signal of the input device 104 to the electronic device 102_1 or 102_2 through the Wi-Fi mechanism in the wireless communication module 160 or the Bluetooth interface circuit, to control the operation of the electronic device 102_1 or 102_2.

In one embodiment, the processing circuit 110 can obtain the mouse/keyboard control signals, such as moving coordinates of the mouse, click commands of the mouse, input characters and symbols of the keyboard, etc., from the input device communication module 130 through the related driver in the program code 122. Then, the processing circuit 110 transmits the mouse/keyboard control signals to the electronic device 102_1 or 102_2 through the wireless communication module 160.

In one embodiment, the input device communication module 130 and the wireless communication module 160 are both Bluetooth wireless communication modules, and the input device communication module 130 and the wireless communication module 160 can share part of the circuits. In the relevant operations, regarding the relationship between the display device 100 and the input device 104, the input device 104 serves as a client and the display device 100 serves as a server, that is, the input device 104 can periodically broadcast a packet indicating that the input device 104 is a mouse or a keyboard, and the processing circuit 110 uses the input device communication module 130 to scan the surrounding Bluetooth devices and performs pairing and connecting operations with the input device 104. On the other hand, regarding the relationship between the display device 100 and the electronic devices 102_1 and 102_2, the display device 100 serves as a client and the electronic devices 102_1 and 102_2 serve as a server, that is, the display device 100 can broadcast a packet indicating that the display device is a mouse or a keyboard (that is, disguised as a mouse or keyboard), and the electronic devices 102_1 and 102_2 scan the surrounding Bluetooth devices and perform pairing and connecting operation with the display device 100.

After the processing circuit 110 controls the wireless communication module 160 to establish a connection with the electronic devices 102_1 and 102_2, the processing circuit 110 can transmit the control signal from the input device 104 to the electronic device 102_1 or 102_2 through the wireless communication module 160. Specifically, when the processing circuit 110 receives a first mouse/keyboard control signal through the input device communication module 130, the processing circuit 110 will properly convert or adjust the first mouse/keyboard control signal to generate a second mouse/keyboard control signal that meets the specifications of the wireless communication module 160 and send it to the electronic device 102_1 or 102_2, so that the electronic device 102_1 or 102_2 performs the corresponding moving coordinates of the mouse, click commands of the mouse, input characters and symbols of the keyboard, etc., according to the second mouse/keyboard control signal. The input characters, symbols, and/or the corresponding mouse/keyboard actions will be displayed on the screen of the electronic device 102_1 or 102_2. In addition, since the screen contents of the electronic device 102_1 and 102_2 are projected on the display panel 170 through the communication modules 140 and 150, the display panel 170 will also display the moving coordinates of the mouse, the click of the mouse, the input characters or symbols of the keyboard, etc.

In addition, the processing circuit 110 will store the setting parameters of the agent transmission control signal mode in the connection setting table 124. The setting parameters may include the device names of the electronic devices 102_1 and 102_2 and the selected agent transmission control signal mode (for example, Bluetooth or Wi-Fi).

In Step 306, when the electronic devices 102_1, 102_2 and the display device 100 are disconnected and then reconnected, the processing circuit 110 can directly use the setting parameters recorded in the connection setting table 124 to quickly complete the setting of agent transmission control signal mode.

Figure 4:
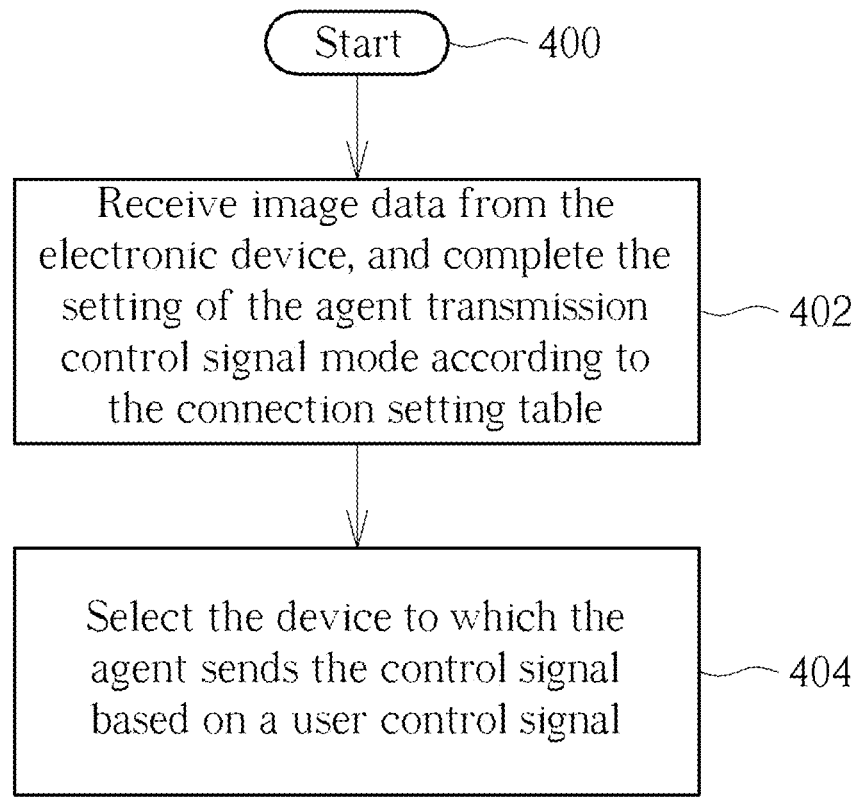
FIG. 4 is a flowchart of a control method of the display device according to one embodiment of the present invention.

FIG. 4 is a flowchart of a control method of the display device 100 according to one embodiment of the present invention. In Step 400, the flow starts. In Step 402, the display device 100 is connected to the electronic devices 102_1 and 102_2 through the communication modules 140 and 150, and receives image data from the electronic devices 102_1 and 102_2, and displays the image data on the display panel 170 as shown in FIG. 2. In addition, the processing circuit 110 completes the setting of the agent transmission control signal mode according to the connection setting table 124 according to Step 304 or Step 306.

In Step 404, the processing circuit 110 selects the device to which the agent sends the control signal according to a user control signal, that is, to which one of the electronic devices 102_1 and 102_2 the control signal from the input device 104 is sent. Taking FIG. 2 as an example, if the user uses a middle button or a left button of the mouse to click the display area 210 through the mouse cursor 202, the processing circuit 110 can determine to send the control signal from the input device 104 to the electronic device 102_1, and at this time the electronic device 102_2 cannot receive the control signal from the input device 104. Similarly, if the user uses the middle button or the left button of the mouse to click the display area 220 through the mouse cursor 202, the processing circuit 110 can determine to send the control signal from the input device 104 to the electronic device 102_2, and at this time the electronic device 102_1 cannot receive the control signal from the input device 104.

Briefly summarized, in embodiments of the present invention, by establishing a connection setting table in the display device, the agent transmission control signal mode can be quickly set after the display device is connected to the electronic device to facilitate user operations. In addition, when the display device supports the simultaneous display of image data from multiple signal sources, and these signal sources come from different image transmission interfaces, the present invention can quickly select the device to which the agent sends the control signal through the user control signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a display device, comprising:
   connecting to a first electronic device by using a first communication module, and receiving first image data from the first electronic device to display on a display panel;
   determining a first agent transmission control signal mode from a connection setting table according to a first connection mode between the first communication module and the first electronic device;

receiving a first control signal from an input device through an input device communication module, generating a second control signal according to the first control signal, and transmitting the second control signal to the first electronic device according to the first agent transmission control signal mode, to control an operation of the first electronic device;

connecting to a second electronic device through a second communication module, and receiving second image data from the second electronic device, wherein the first image data and the second image data are respectively displayed on a first display area and a second display area of the display panel;

determining a second agent transmission control signal mode from the connection setting table according to a second connection mode between the second communication module and the second electronic device; and selectively transmitting the second control signal to the first electronic device according to the first agent transmission control signal mode to control the operation of the first electronic device, or transmitting the second control signal to the second electronic device according to the second agent transmission control signal mode to control an operation of the second electronic device.

2. The control method of claim 1, wherein the first connection mode corresponds to High Definition Multimedia Interface (HDMI) or DisplayPort (DP), the first agent transmission control signal mode is a Wi-Fi mode or a Bluetooth mode.

3. The control method of claim 1, wherein the input device is a mouse or a keyboard, and the first control signal is a mouse control signal or a keyboard control signal.

4. The control method of claim 1, wherein the input device communication module is a Bluetooth communication module, the input device is a Bluetooth client, and the display device is a Bluetooth server; and the control method further comprises:

connecting to the first electronic device through a wireless communication module, wherein the wireless communication module is another Bluetooth communication module, the display device is the Bluetooth client, and the first electronic device is the Bluetooth server.

5. The control method of claim 1, wherein the step of selectively transmitting the second control signal to the first electronic device according to the first agent transmission control signal mode to control the operation of the first electronic device, or transmitting the second control signal to the second electronic device according to the second agent transmission control signal mode to control the operation of the second electronic device comprises:

referring to a user control signal to transmit the second control signal to the first electronic device according to the first agent transmission control signal mode to control the operation of the first electronic device, or to transmit the second control signal to the second electronic device according to the second agent transmission control signal mode to control the operation of the second electronic device.

6. A display device, comprising:
a first communication module;
an input device communication module; and
a processing circuit, configured to:
connect to a first electronic device by using the first communication module, and receive first image data from the first electronic device to display on a display panel;

determine a first agent transmission control signal mode from a connection setting table according to a first connection mode between the first communication module and the first electronic device;

receive a first control signal from an input device through the input device communication module, generating a second control signal according to the first control signal, and transmit the second control signal to the first electronic device according to the first agent transmission control signal mode, to control an operation of the first electronic device;

connect to a second electronic device through a second communication module, and receive second image data from the second electronic device, wherein the first image data and the second image data are respectively displayed on a first display area and a second display area of the display panel;

determine a second agent transmission control signal mode from the connection setting table according to a second connection mode between the second communication module and the second electronic device; and selectively transmit the second control signal to the first electronic device according to the first agent transmission control signal mode to control the operation of the first electronic device, or transmit the second control signal to the second electronic device according to the second agent transmission control signal mode to control an operation of the second electronic device.

7. The display device of claim 6, wherein the first connection mode corresponds to High Definition Multimedia Interface (HDMI) or DisplayPort (DP), the first agent transmission control signal mode is a Wi-Fi mode or a Bluetooth mode.

8. The display device of claim 6, wherein the input device is a mouse or a keyboard, and the first control signal is a mouse control signal or a keyboard control signal.

9. The display device of claim 6, wherein the input device communication module is a Bluetooth communication module, the input device is a Bluetooth client, and the display device is a Bluetooth server; and the processing circuit further performs the steps of:

connecting to the first electronic device through a wireless communication module, wherein the wireless communication module is another Bluetooth communication module, the display device is the Bluetooth client, and the first electronic device is the Bluetooth server.

10. The display device of claim 6, wherein the step of selectively transmitting the second control signal to the first electronic device according to the first agent transmission control signal mode to control the operation of the first electronic device, or transmitting the second control signal to the second electronic device according to the second agent transmission control signal mode to control the operation of the second electronic device comprises:

referring to a user control signal to transmit the second control signal to the first electronic device according to the first agent transmission control signal mode to control the operation of the first electronic device, or to transmit the second control signal to the second electronic device according to the second agent transmission control signal mode to control the operation of the second electronic device.

* * * * *